United States Patent
Satlewal et al.

(10) Patent No.: US 12,492,159 B2
(45) Date of Patent: Dec. 9, 2025

(54) METHOD FOR PRODUCING LEVULINIC ACID

(71) Applicants: INDIAN OIL CORPORATION LIMITED, Maharashtra (IN); DEPARTMENT OF BIOTECHNOLOGY, New Delhi (IN)

(72) Inventors: Alok Satlewal, Faridabad (IN); Ruchi Agrawal, Faridabad (IN); Ravindra Kumar, Faridabad (IN); Ravi Prakash Gupta, Faridabad (IN); Sankara Sri Venkata Ramakumar, Faridabad (IN)

(73) Assignees: INDIAN OIL CORPORATION LIMITED (IN); DEPARTMENT OF BIOTECHNOLOGY (IN)

( * ) Notice: Subject to any disclaimer, the term of this patent is extended or adjusted under 35 U.S.C. 154(b) by 445 days.

(21) Appl. No.: 18/135,054

(22) Filed: Apr. 14, 2023

(65) Prior Publication Data
US 2023/0339838 A1    Oct. 26, 2023

(30) Foreign Application Priority Data
Apr. 22, 2022 (IN) .............................. 202221023739

(51) Int. Cl.
*C07C 51/487* (2006.01)
*C07C 59/185* (2006.01)

(52) U.S. Cl.
CPC .......... *C07C 51/487* (2013.01); *C07C 59/185* (2013.01)

(58) Field of Classification Search
CPC ...... C07C 51/487; C07C 51/00; C07C 59/185
See application file for complete search history.

(56) References Cited

U.S. PATENT DOCUMENTS

| | | |
|---|---|---|
| 3,065,263 A | 11/1962 | Carlson |
| 3,258,481 A | 6/1966 | Sassenrath et al. |
| 4,897,497 A | 1/1990 | Fitzpatrick |
| 5,608,105 A | 3/1997 | Fitzpatrick |

(Continued)

FOREIGN PATENT DOCUMENTS

| | | | |
|---|---|---|---|
| CN | 101648863 A | 2/2010 | |
| CN | 104402722 A | 3/2015 | |
| CN | 104292193 B * | 1/2017 | ............ Y02P 20/582 |

(Continued)

OTHER PUBLICATIONS

Kapoor et al., "Impact of Conditioning Prior to Dilute Acid Deconstruction of Biomass for the Production of Fermentable Sugars", Sustainable Chemistry and Engineering, vol. 5, pp. 4285-4292, 2017.

(Continued)

*Primary Examiner* — Yate' K Cutliff

(57) ABSTRACT

The present disclosure relates to a process for producing levulinic acid from the technical lignin. The technical lignin is rich in lignin and ash and do not have any other use and usually incinerated as a waste management strategy. During the incineration process, the cellulose also gets burnt and wasted. In the present disclosure, there is provided an economical and environmentally friendly process to produce levulinic acid from the technical lignin by using a synergistic combination of catalysts for high yields and high titer with acid recycling in a cost-effective manner.

14 Claims, 2 Drawing Sheets

(56) References Cited

U.S. PATENT DOCUMENTS 9,174,909 B2    11/2015    Runge

FOREIGN PATENT DOCUMENTS

CN            111393279 A  *  7/2020  ............. C07C 51/00
WO         2014/087015 A1      6/2014

OTHER PUBLICATIONS

Boonyakarn et al., "Enhanced Levulinic Acid Production from Cellulose by Combined Brønsted Hydrothermal Carbon and Lewis Acid Catalysts", I & EC research, vol. 58, pp. 2697-2703, 2019.
Liu et al., "Production of Levulinic Acid from Cellulose and Cellulosic Biomass in Di erent Catalytic Systems", catalysts, vol. 10, pp. 1-22, 2020.

* cited by examiner

METHOD FOR PRODUCING LEVULINIC ACID

FIELD OF THE INVENTION

The present disclosure relates to a process for producing levulinic acid. More particularly, the present disclosure relates to a method for producing levulinic acid from technical lignin.

BACKGROUND OF THE INVENTION

Levulinic acid, also known as 4-oxopentanoic acid, is a white crystalline solid, soluble in water and polar organic solvents. It is relatively stable toward further chemical reaction under hydrolysis conditions. Levulinic acid is used as a precursor for pharmaceuticals, plasticizers, and various other additives. Processes have been developed to produce it from wood, cellulose, starch, or glucose.

Technical lignin refers to the derivatives obtained as a result of the delignification process of the lignocellulosic biomass. Traditionally, technical lignin is obtained as a by-product of paper mills. Technical lignin being highly recalcitrant in nature and currently has no other use except burning to generate heat which is majorly a waste management strategy. Thus, there is an urgent need to develop a process to valorize it and develop high value products in a biorefinery for improved biofuels sustainability. One of the primary objectives of the present disclosure is to valorize the technical lignin to value added products or bio-chemicals.

U.S. Pat. No. 3,258,481 describes a process of production of levulinic acid from bagasse, wood sawdust, wastepaper, starch, corncobs, sucrose, or molasses using a strong acid catalyst (hydrochloric acid, sulfuric acid, phosphoric acid, para-toluene sulfonic acid, and hydrobromic acid). Wherein, the recycling of exothermic heat containing vapors and volatile HCl, wash liquor (from washing of solids containing levulinic acid) and lactones, claiming high yield of yellow colored levulinic acid. The recycling has been done through a pre-heater and is a multi-pot reaction (operating conditions: 1-5% w/v acid, 150-250° C. temperature, 1 s-3 h).

U.S. Pat. No. 4,897,497 describes a process wherein a two-reactor continuous system in which furfural and levulinic acid are produced from lignocellulose (hardwood) at 5-25% solids. Furfural and lignin from first reactor (operating conditions: 1-10% w/v acid, 180-265° C. temperature) are collected before entering into the second reactor (operating conditions: 1-15% w/v acid, 130-250° C. temperature, 1-60 min). The furfural and levulinic acid yields were >75% and >55% respectively that theoretically can be derived.

WO 2014/087015A1 describes that washing with a vapor condensate (obtained by vaporizing the raffinate directly after centrifugation) results in higher levulinic acid yields as compared to washing with normal water. Also, it describes that washing with aqueous phase (other than the organic solvent during extractions) results in a less compressible filter cake. Washing first with aqueous phase and subsequently with vapor condensate results in even higher levulinic acid yields.

U.S. Pat. No. 9,174,909B2 describes a 2-stage process wherein the first step extracted the pentosans while the second converts the hexosans to LA. The purpose of the two steps is to secure the pentosans and simultaneously reduce the humins.

U.S. Pat. No. 3,065,263 describes a process where three series of ten cyclic digestions were made for residence times of 15, 30 and 60 minutes. (Operating conditions: 4-10% w/v acid, 6-10% of recycled levulinic acid, 140-200° C. temperature, 5 min-60 min). Total solids were 1-15% by weight.

U.S. Pat. No. 5,608,105 describes another biofine process featuring a two-reactor continuous system in which hydroxyl methyl furfural from first reactor (operating conditions: 1-5% w/v acid, 210-230° C. temperature, 13-25 seconds) enters the second reactor (operating conditions: 3-7.5% w/v acid, 195-215° C. temperature, 15-60 minutes) to yield levulinic acid.

Liu et al, 2020 discussed the state of art of the mechanism, pretreatment, and catalytic systems of levulinic acid production from cellulose, lignocellulosic biomass & industrial production status. It discloses a method of producing levulinic acid from expensive substrates such as pure sugars (glucose, fructose), costly carbohydrates (starch, cellulose), and "cellulose-rich low-lignin" raw material/biomass (flour, pulp, paper, miscanthus, cotton, bagasse etc.). These substrates are composed of more than 60% sugar/carbohydrates and few of them are constitutive of 100% sugars.

Tat Boonyakarn et. al, 2019 discloses a catalyst system for conversion of cellulose to levulinic acid. CN101648863 discloses a method for preparing levulinic acids by using straw biomass. CN104402722A discloses a lignocellulose biomass alcoholysis method for preparation of levulinate and furan derivatives. None of the cited prior arts provides a simple, one pot method to produce levulinic acid from high lignin (35-40%) and high ash (30-45%) containing waste, technical lignin.

OBJECTIVES OF THE INVENTION

The primary object of the present disclosure is to develop a process for producing high value levulinic acid from technical lignin.

Another object of the present disclosure is to provide a catalyst comprising a combination of mineral acid and lewis acid optimized to produce levulinic acid from technical lignin.

Still another objective of the present disclosure is to provide a cost-effective process for obtaining improved yield of levulinic acid at high solid loading of cellulose substrate. In order to overcome the aforesaid drawbacks of the conventional processes, the present disclosure provides a method where levulinic acid is produced from the technical lignin, which is a waste. The process of the present disclosure is advantageous over existing processes as it provides a process to valorize technical lignin to produce high value levulinic acid. This waste does not have any other use except incineration as a waste management practice. Hence, the present disclosure provides an economical and environment friendly process for producing levulinic acid from technical lignin. Further, the present process enables cellulose purification from technical lignin waste using an optimized combination of formic acid and technical spirit at high temperature (160-180° C.) for 30-60 minutes at autogenic pressure (15-20 bar). Further, the synergistic combination of a mineral acid and lewis acid as catalyst results in high yields of levulinic acid (65%) as compared to methods disclosed in prior art (30-40%). The method of the present disclosure works at high total solids (20-25%) as compared to 5-10% available in prior art. Further, high purity (88%) levulinic acid is produced by the method of the present disclosure. The method of the present disclosure provides an optimized process with reduced biochar/humins generation and without any other byproduct formation such as furfurals, HMF, aldehydes etc. to aid in simple and low costs downstream processing. In view of above, the process of the present disclosure is a cost-effective process for the production of levulinic acid by utilizing the cheap waste technical lignin.

The process of the present disclosure enables utilization of technical lignin, a waste residue, for levulinic acid production at high solid loadings and enables valorization of technical lignin.

SUMMARY OF INVENTION

The present disclosure relates to a process for producing levulinic acid. Accordingly, the present disclosure provides a simple, one pot process for producing levulinic acid from the technical lignin. In a preferred aspect, the technical lignin is recovered from 2G biorefinery after ethanol production and distillation.

In an embodiment of the present disclosure, there is provided a process for producing levulinic acid from technical lignin, said process comprising:
  a) treating technical lignin with a combination of formic acid and technical spirit in a high-pressure reactor for obtaining cellulose and lignin;
  b) subjecting cellulose of step a) to treatment with a catalyst to obtain a slurry;
  c) centrifuging the slurry followed by mixing the levulinic acid containing liquid fraction with a solvent to obtain an organic mixture and acidic aqueous liquid waste;
  d) evaporating the solvent from the organic mixture to obtain levulinic acid; and
  e) recycling the acidic aqueous liquid waste of step c) and solvent of step d) for the next round of levulinic acid extraction and purification;
  wherein technical lignin comprises 10-25% cellulose, 0-5% hemicellulose, 25-55% lignin and 20-50% ash content.

In an embodiment of the present disclosure, there is provided a process for producing levulinic acid from technical lignin as described herein, wherein the combination of formic acid and technical spirit is present in a ratio of 1:1.

In an embodiment of the present disclosure, there is provided a process for producing levulinic acid from technical lignin as described herein, wherein the high-pressure reactor (HPR) is operated at a temperature of 160-180° C., and wherein technical lignin is treated with a combination of formic acid and technical spirit for 1 hour.

In an embodiment of the present disclosure, there is provided a process for process for producing levulinic acid from technical lignin as described herein, wherein the catalyst comprises of a combination of mineral acid and lewis acid.

In an embodiment of the present disclosure, there is provided a process for process for producing levulinic acid from technical lignin as described herein, wherein the cellulose is subjected to the catalyst treatment at a temperature of 80-200° C. for 30-60 minutes.

In an embodiment of the present disclosure, there is provided a process for producing levulinic acid from technical lignin as described herein, wherein the solvent is selected from the group comprising of dichloromethane, diethyl ether and ethyl acetate.

In an embodiment of the present disclosure, there is provided a process for producing levulinic acid from technical lignin as described herein, wherein the levulinic acid containing liquid fraction and solvent in step c) are present in 1:3 ratio.

In an embodiment of the present disclosure, there is provided a process for producing levulinic acid from technical lignin as described herein, wherein the levulinic acid is yielded as 71% of the theoretical yield.

In an embodiment of the present disclosure, there is provided a process for producing levulinic acid from technical lignin as described herein, wherein the technical spirit comprises ethanol 85%, acetic acid 5%, acetaldehyde 5% and water 5%.

In an embodiment of the present disclosure, there is provided a process for producing levulinic acid from technical lignin as described herein, wherein mineral acid is selected from the group consisting of sulphuric acid, hydrochloric acid, nitric acid and phosphoric acid; and wherein lewis acid is selected from the group consisting of aluminium chloride, ferric chloride and chromium chloride.

In an embodiment of the present disclosure, there is provided a process for producing levulinic acid from technical lignin as described herein, wherein 10-30% w/v of cellulose solid loading is used in step b) of the process.

In an embodiment of the present disclosure, there is provided a process for producing levulinic acid from technical lignin as described herein, wherein catalyst is a combination of sulphuric acid and ferric chloride added at a concentration of 4% (v/v) in 1 L HPR at 200° C.

In an embodiment of the present disclosure, there is provided a process for producing levulinic acid from technical lignin as described herein, wherein the process yields 34.7-65.1 wt % levulinic acid with 88% purity.

These and other features, aspects, and advantages of the present subject matter will be better understood with reference to the following description. This summary is provided to introduce a selection of concepts in a simplified form.

BRIEF DESCRIPTION OF THE ACCOMPANYING DRAWINGS

The following figures form part of the present specification and are included to further illustrate aspects of the present disclosure. The disclosure may be better understood by reference to the figures in combination with the detailed description of the specific embodiments presented herein.

DETAILED DESCRIPTION OF THE INVENTION

Figure 1:
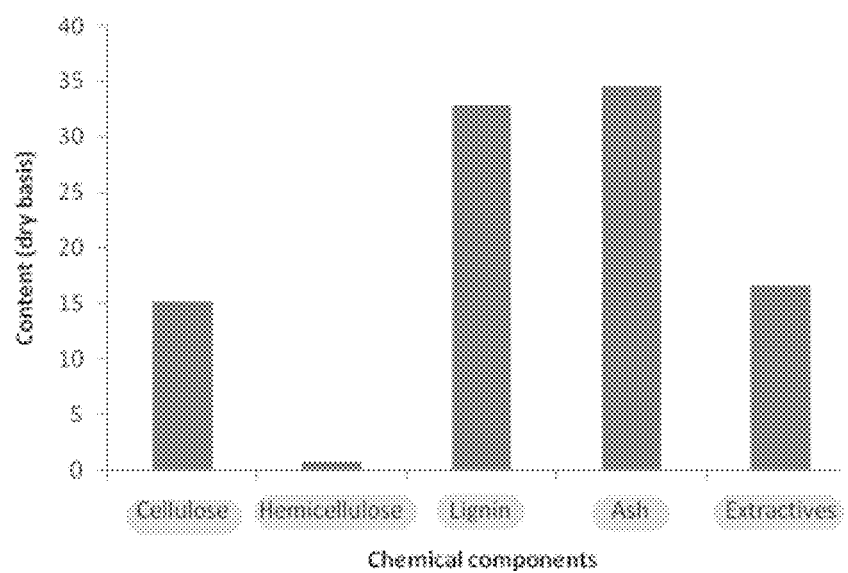
FIG. 1 is a graphical representation of chemical composition of technical lignin comprising cellulose, hemicellulose, lignin, and ash content.

Those skilled in the art will be aware that the present disclosure is subject to variations and modifications other than those specifically described. It is to be understood that the present disclosure includes all such variations and modifications. The disclosure also includes all such steps of the process, features of the product, referred to or indicated in this specification, individually or collectively, and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The present disclosure is not to be limited in scope by the specific embodiments described herein, which are intended for the purposes of exemplification only. Functionally equivalent products and methods are clearly within the scope of the disclosure, as described herein.

Technical lignin is derived mainly from lignocellulosic biomass. Traditionally, technical lignin is obtained as a by-product of paper mills. In a preferred aspect of the present disclosure, the residue generated after ethanol distillation and recovery is termed as 2-G Biorefinery waste residue or technical lignin. Technical lignin obtained after enzymatic hydrolysis, fermentation and distillation was stored in a cool and dried place directly after air drying, for the study. The technical lignin being highly recalcitrant in nature, does not have any other usage except burning in a boiler to generate heat and power. However, this is generally considered as a waste management practice instead of a valuable or economically profitable proposition for the 2G ethanol production technology.

The chemical composition of technical lignin was determined, organosolv extraction of cellulose, screening of catalyst, catalyst concentration optimization, synergistic catalysis was determined, levulinic acid production process was optimized at 2 Kg scale. The technical lignin used in the process of the present disclosure comprises 10-25% cellulose, 0-5% hemicellulose, 25-55% lignin and 20-50% ash content.

In an aspect, the present disclosure relates to a process for producing levulinic acid from technical lignin. Accordingly, the present disclosure provides a simple, one pot process for producing levulinic acid from the technical lignin.

In an embodiment, the present disclosure provides a process for producing levulinic acid from technical lignin, said process comprising:
a) treating technical lignin with a combination of formic acid and technical spirit in a high-pressure reactor for obtaining cellulose and lignin; b) subjecting cellulose of step a) to treatment with a catalyst to obtain a slurry; c) centrifuging the slurry followed by mixing the levulinic acid containing liquid fraction with a solvent to obtain an organic mixture and acidic aqueous liquid waste; d) evaporating the solvent from the organic mixture to obtain levulinic acid; and e) recycling the acidic aqueous liquid waste of step c) and solvent of step d) for the next round of levulinic acid extraction and purification; wherein technical lignin comprises 10-25% cellulose, 0-5% hemicellulose, 25-55% lignin and 20-50% ash content.

In an embodiment of the present disclosure, there is provided a process for producing levulinic acid from technical lignin as described herein, wherein the combination of formic acid and technical spirit is present in a ratio of 1:1.

In an embodiment of the present disclosure, there is provided a process for producing levulinic acid from technical lignin as described herein, wherein the high-pressure reactor (HPR) is operated at a temperature of 160-180° C., and wherein technical lignin is treated with a combination of formic acid and technical spirit for 1 hour.

In an embodiment of the present disclosure, there is provided a process for producing levulinic acid from technical lignin as described herein, wherein the catalyst comprises of a combination of mineral acid and lewis acid.

In an embodiment of the present disclosure, there is provided a process for producing levulinic acid from technical lignin as described herein, wherein the cellulose is subjected to the catalyst treatment at a temperature of 80-200° C. for 30-60 minutes.

In an embodiment of the present disclosure, there is provided a process for producing levulinic acid from technical lignin as described herein, wherein the solvent is selected from the group comprising of dichloromethane, diethyl ether and ethyl acetate.

In an embodiment of the present disclosure, there is provided a process for producing levulinic acid from technical lignin as described herein, wherein the levulinic acid containing liquid fraction and solvent in step c) are present in 1:3 ratio.

In an embodiment of the present disclosure, there is provided a process for producing levulinic acid from technical lignin as described herein, wherein the levulinic acid is yielded as 71% of the theoretical yield.

In an embodiment of the present disclosure, there is provided a process for producing levulinic acid from technical lignin as described herein, wherein the technical spirit comprises ethanol 85%, acetic acid 5%, acetaldehyde 5% and water 5%.

In an embodiment of the present disclosure, there is provided a process for producing levulinic acid from technical lignin as described herein, wherein mineral acid is selected from the group consisting of sulphuric acid, hydrochloric acid, nitric acid and phosphoric acid; and wherein lewis acid is selected from the group consisting of aluminium chloride, ferric chloride and chromium chloride.

In an embodiment of the present disclosure, there is provided a process for producing levulinic acid from technical lignin as described herein, wherein 10-30% w/v of cellulose solid loading is used in step b) of the process.

In an embodiment of the present disclosure, there is provided a process for producing levulinic acid from technical lignin as described herein, wherein catalyst is a combination of sulphuric acid and ferric chloride added at a concentration of 4% (v/v) in 1 L HPR at 200° C.

In an embodiment of the present disclosure, there is provided a process for producing levulinic acid from technical lignin as described herein, wherein the process yields 34.7-65.1 wt % levulinic acid with 88% purity.

Although the subject matter has been described in considerable detail with reference to certain preferred embodiments thereof, other embodiments are possible.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods, the exemplary methods, devices and materials are described herein. It is to be understood that this disclosure is not limited to particular methods, and experimental conditions described, as such methods and conditions may vary.

Example 1: Compositional Analysis

The technical lignin used in the process of the present disclosure was purchased from a local vendor on non-commercial basis for research purposes. The chemical composition of technical lignin was determined by NREL protocol (NREL/TP-510-42618). Sugar and inhibitors concentration in the liquid hydrolysates were measured by HPLC following NREL LAP as described in Kapoor et al., 2017, using Bio-Rad Aminex HPX-87H column coupled with refractive index (RI) and Photo Diode Array (PDA) detector at a flow rate of 0.6 ml/min at column temperature of 50° C. The mobile phase was 0.005 N $H_2SO_4$. The chemical composition of technical lignin and their values vary depending upon the raw material, processing and the industry. The chemical composition of technical lignin is shown in FIG. 1 of the present disclosure. From the results obtained, it was observed that technical lignin comprises 10-25% cellulose, 0-5% hemicellulose, 25-55% lignin, 20-50% ash contents.

Example 2: Cellulose Extraction from Technical Lignin

The cellulose is extracted from the technical lignin by an optimized organosolv processing by using a combination of formic acid and technical spirit present in a ratio of 1:1, in a high-pressure reactor at 160-180° C. for 1 hour. The chemical composition of technical spirit obtained in ethanol production unit is depicted in table 1 below.

TABLE 1

Chemical composition of technical spirit

| S. No. | Component | Content (%) |
|---|---|---|
| 1 | Ethanol | 85.0% |
| 2 | Water | 5.0% |
| 3 | Acetic acid | 5.0% |
| 4 | Acetaldehyde | 5.0% |

Optimization of solvents for organosolv process was carried out by evaluating different combinations of solvents, as shown in table 2 below.

TABLE 2

Evaluation of Formic acid in combination with ethanol/technical spirit for lignin solubilization

| S. No. | Solvent | Temperature (° C.) | Pressure (Bar) | Time (min) | Solubilization (%) | Remarks |
|---|---|---|---|---|---|---|
| 1 | Formic acid | 160 | 6 | 60 | 18.2 | Low solubilization |
| 2 | Formic acid + Ethanol (1:1) | 160 | 11 | 60 | 28.62 | High solubilization with low ash |
| 3 | Formic acid + Spirit (1:1) | 160 | 9 | 60 | 36.8 | High solubilization with low ash |
| 4 | Formic acid + Water | 160 | 6 | 60 | 11.3 | Low solubilization |
| 5 | Formic acid + acetic acid | 160 | 6 | 60 | 14.1 | Low solubilization |
| 6 | Formic acid + acetaldehyde | 160 | 6 | 60 | 12.4 | Low solubilization |
| 7 | Formic acid + ethanol + Water + acetic acid + acetaldehyde | 160 | 9 | 60 | 36.0 | High solubilization with low ash |

From the table 2 results obtained, it was shown that the Formic acid+Spirit (technical spirit) present in 1:1 ratio recovers high amount of lignin as compared to other solvent combinations. Hence, Formic acid+Spirit (1:1) is selected and used in subsequent steps of the process of the present disclosure.

Example 3: Extraction of Cellulose from Technical Lignin by Organosolv [Optimization Of Temperature (120-200° C.)]

Figure 2:
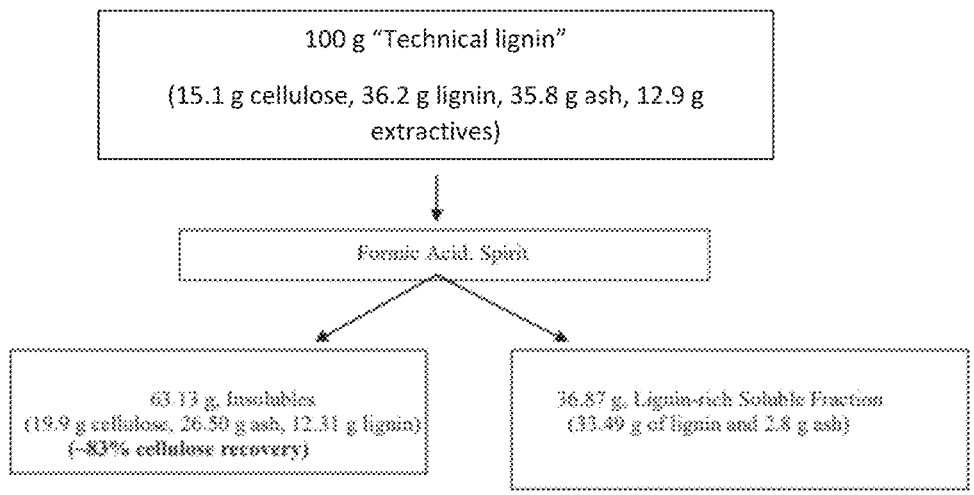
FIG. 2 is a schematic representation of mass balance of cellulose extraction from technical lignin using a combination of Formic acid and Spirit.

Based on extensive screening, a mixture of solvents was evaluated for cellulose extraction from technical lignin i.e., Formic acid: Spirit. Different combinations of formic acid: spirit was evaluated, as shown in FIG. 2 of the present disclosure, and it was found that high recovery of cellulose (92%) and lignin (67.6) was obtained at 160° C. with Formic acid: Spirit, as shown in table 3 below.

TABLE 3

Optimization of temperature for maximum recovery of cellulose lignin using Formic acid: Spirit

| HRP Treatments Temperature/Time | Total Lignin Recovery (%) | Total Cellulose Recovery (%) |
|---|---|---|
| 120° C./1 h | 32.8 | 98.1 |
| 140° C./1 h | 45.2 | 96.4 |
| 160° C./1 h | 67.6 | 92.0 |
| 180° C./1 h | 61.7 | 89.7 |
| 190° C./1 h | 57.1 | 87.6 |
| 200° C./1 h | 52.1 | 83.8 |

Example 4: Catalyst Screening and Concentration Optimization

Screening of catalyst for levulinic acid production was carried out using organosolv cellulose as the substrate at 200° C. for 3 hours. It showed that a synergistic combination of strong mineral acid ($H_2SO_4$, HCl, $HNO_3$ and $H_3PO_4$) and weak lewis acid ($AlCl_3$, $FeCl_3$, $CrCl_3$) is optimum for the levulinic acid production. The study was performed in 1 L HPR at 200° C. under autogenic pressure. Levulinic acid was measured for each reaction by HPLC following proper dilution of samples using Bio-Rad Aminex HPX-87H column coupled with refractive index (RI) and Photo Diode Array (PDA) detector at a flow rate of 0.6 ml/min at column temperature of 50° C. The mobile phase was 0.005 N $H_2SO_4$.

From the results obtained, it was indicated that $H_2SO_4$ give optimum yields of 66% followed by $H_3PO_4$ yielding ~50% levulinic acid in combination with $FeCl_3$, as shown in table 4 below.

TABLE 4

Screening of catalysts and concentration optimization

| S. No. | Substrate | Solvent/Catalyst | Levulinic acid |
|---|---|---|---|
| 1 | Organosolv | 1% $H_2SO_4$ | 17.6 |
| 2 | cellulose | 2% $H_2SO_4$ | 20.7 |
| 3 | | 3% $H_2SO_4$ | 32.5 |
| 4 | | 2% $AlCl_3$ | 3.4 |
| 5 | | 2% $FeCl_3$ | 18.3 |
| 6 | | 2% $CrCl_3$ | 16.5 |
| 7 | | 2% $H_2SO_4$ + 2% $AlCl_3$ | 40.4 |
| 8 | | 2% $H_2SO_4$ + 2% $CrCl_3$ | 43.3 |
| 9 | | 2% $H_2SO_4$ + 2% $FeCl_3$ | 49.6 |
| 10 | | 4% $H_2SO_4$ + 4% $FeCl_3$ | 65.6 |
| 11 | | 4% HCL + 4% $FeCl_3$ | 37.5 |
| 12 | | 4% $HNO_3$ + 4% $FeCl_3$ | 3.3 |
| 13 | | 4% $H_3PO_4$ + 4% $FeCl_3$ | 49.3 |
| 14 | | 5% $H_2SO_4$ + 5% $FeCl_3$ | 56.2 |
| 15 | | 8% $H_2SO_4$ + 8% $FeCl_3$ | 56.7 |
| 16 | | 10% $H_2SO_4$ + 10% $FeCl_3$ | 57.3 |

Example 5: Levulinic Acid Production at Different Solid Loadings

Levulinic acid production was studied at different solid loadings (10-30%, w/v) of organosolv cellulose recovered from technical lignin. The catalysts ($H_2SO_4$ & $FeCl_3$) were added at 4% (v/v) concentration in 1 L HPR (200° C.). The yields were 65.1%, 62.6% and 34.7% at 10%, 20% and 25% total solids loadings, respectively, as shown in table 5 below. Levulinic acid yields dropped at higher solid loadings (i.e., above 20%) due to high viscosity and mass transfer issues. Thus, 20% (w/v) was indicated to be the optimum loading for both the substrates. Since no free-flowing fluid was there at 30% total solid loading, reaction could not be run (thus no data at 30% TS).

TABLE 5

Levulinic acid production at different solid loadings

| S. No. | Substrate | Solid loadings (%) | Levulinic acid (%) |
|---|---|---|---|
| 1 | Organosolv | 10 | 65.1 |
| 2 | cellulose | 20 | 62.6 |
| 3 | | 25 | 34.7 |
| 4 | | 30 | No reaction |

Example 6: Downstream Processing by Solvent Recycling

Figure 3:
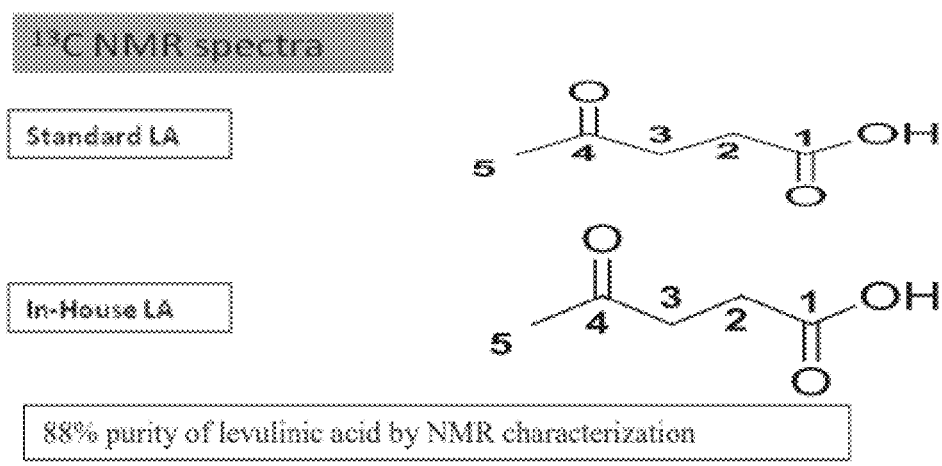
FIG. 3 depicts NMR characterization of levulinic acid using $^{13}C$ for determining purity of levulinic acid produced by the present method.

After levulinic acid production in the reactor the slurry is recovered, and the solid liquid separation was carried out by centrifugation. The levulinic acid containing liquid is mixed with selected solvent such as dichloromethane or diethyl ether or ethyl acetate in 1:3 ratio. The levulinic acid is preferentially distributed in the organic solvent layer which is extracted using a separating funnel and the acidic aqueous liquid waste is processed separately. The solvent was evaporated from the organic mixture by using rotavapor to recover the high purity (88%) levulinic acid and the solvent is recycled for the next round of levulinic acid extraction and purification, as shown in FIG. 3 of the present disclosure.

We claim:

1. A process for producing levulinic acid from technical lignin, the process comprising:
   a) treating technical lignin with a combination of formic acid and technical spirit in a high-pressure reactor (HPR) for obtaining cellulose and lignin;
   b) subjecting the cellulose of step a) to a treatment with a catalyst to obtain a slurry;
   c) centrifuging the slurry to obtain a levulinic acid containing liquid fraction;
   d) mixing the levulinic acid containing liquid fraction with a solvent to obtain an organic mixture and an acidic aqueous liquid waste;
   e) evaporating the solvent from the organic mixture to obtain levulinic acid; and
   f) recycling the acidic aqueous liquid waste of step d) and solvent of step d) for a subsequent cycle of levulinic acid extraction and purification;
   wherein the technical lignin comprises 10-25% cellulose, 0-5% hemicellulose, 25-55% lignin and 20-50% ash content.

2. The process as claimed in claim 1, wherein the formic acid and technical spirit are present in the combination in a ratio of 1:1.

3. The process as claimed in claim 1, wherein the high-pressure reactor (HPR) is operated at a temperature in a range of 160-180° C., and wherein the technical lignin is treated with the combination of formic acid and technical spirit for 1 hour.

4. The process as claimed in claim 1, wherein the catalyst comprises a combination of mineral acid and lewis acid.

5. The process as claimed in claim 1, wherein the cellulose is subjected to the catalyst treatment at a temperature in a range of 80-200° C. for 30-60 minutes.

6. The process as claimed in claim 1, wherein the solvent is selected from the group consisting of dichloromethane, diethyl ether and ethyl acetate.

7. The process as claimed in claim 1, wherein the levulinic acid containing liquid fraction and the solvent are present in 1:3 ratio.

8. The process as claimed in claim 1, wherein an yield of the levulinic acid is 71% of the theoretical yield.

9. The process as claimed in claim 1, wherein the technical spirit comprises 85% of ethanol, 5% of acetic acid, 5% of acetaldehyde and 5% of water.

10. The process as claimed in claim 4, wherein the mineral acid is selected from the group consisting of sulphuric acid, hydrochloric acid, nitric acid and phosphoric acid; and wherein the lewis acid is selected from the group consisting of aluminium chloride, ferric chloride and chromium chloride.

11. The process as claimed in claim 1, wherein 10-30% w/v of cellulose loading is used in step b) of the process.

12. The process as claimed in claim 1, wherein the catalyst is a combination of sulphuric acid and ferric chloride.

13. The process as claimed in claim 1, wherein the catalyst is added at a concentration of 4% (v/v) in the HPR at a temperature of 200° C.

14. The process as claimed in claim 1, wherein the process yields levulinic acid in a range of 34.7-65.1 wt % with 88% purity.

* * * * *